July 10, 1956

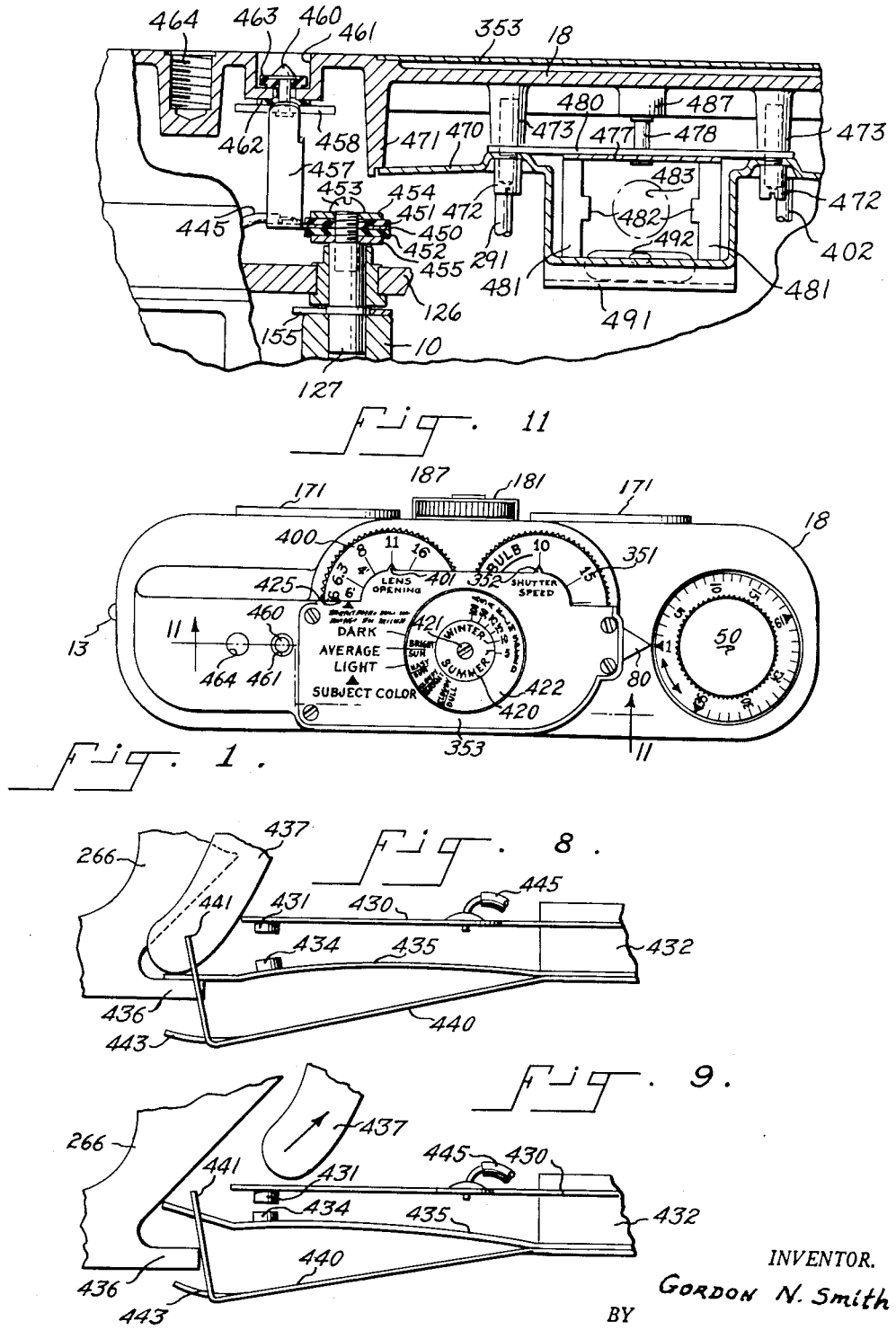

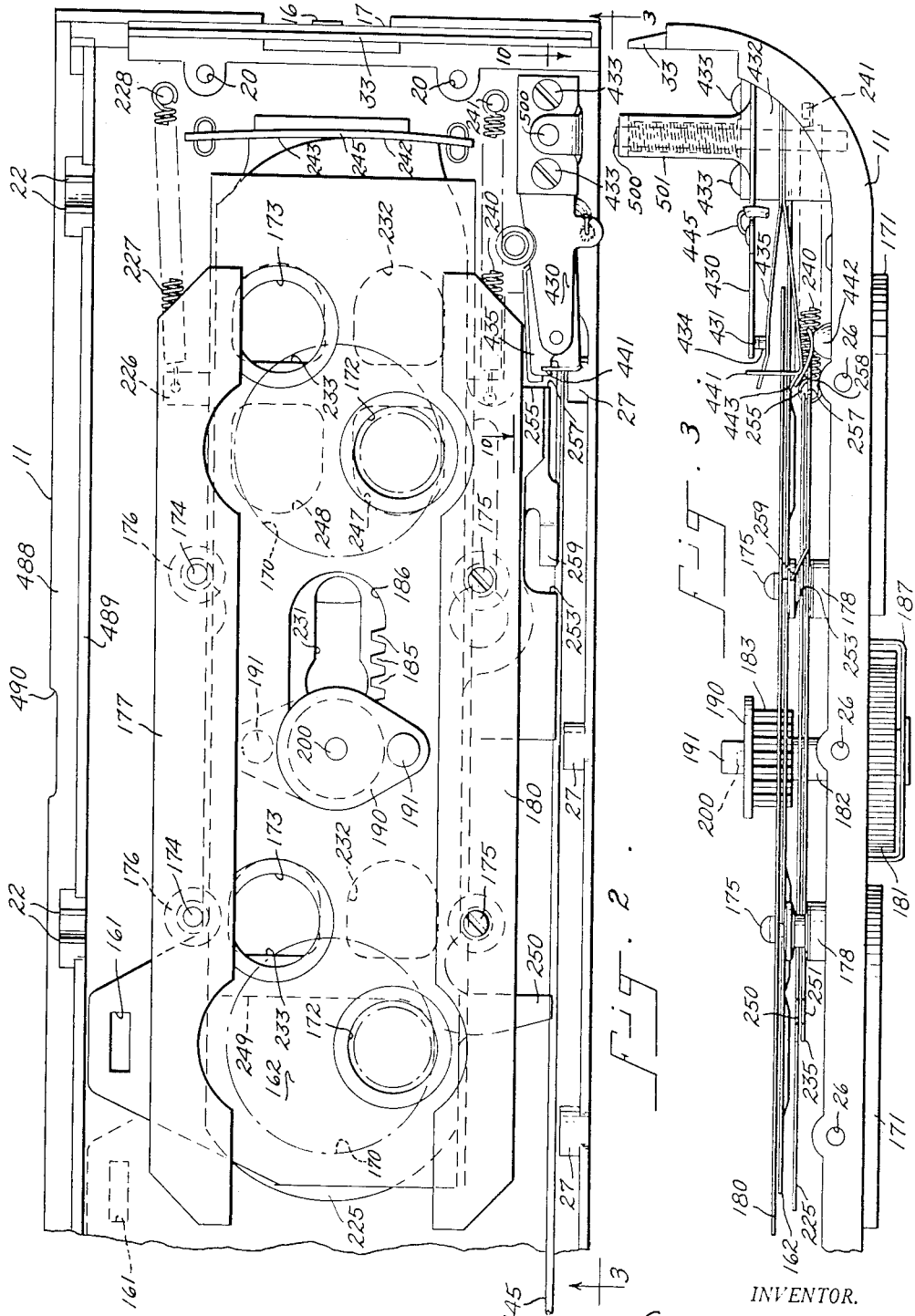

G. N. SMITH 2,753,773

PHOTOFLASH SYNCHRONIZING MEANS FOR A CAMERA

Original Filed July 3, 1950

INVENTOR.
GORDON N. Smith
BY
Buckhorn and Cheatham
Attorneys

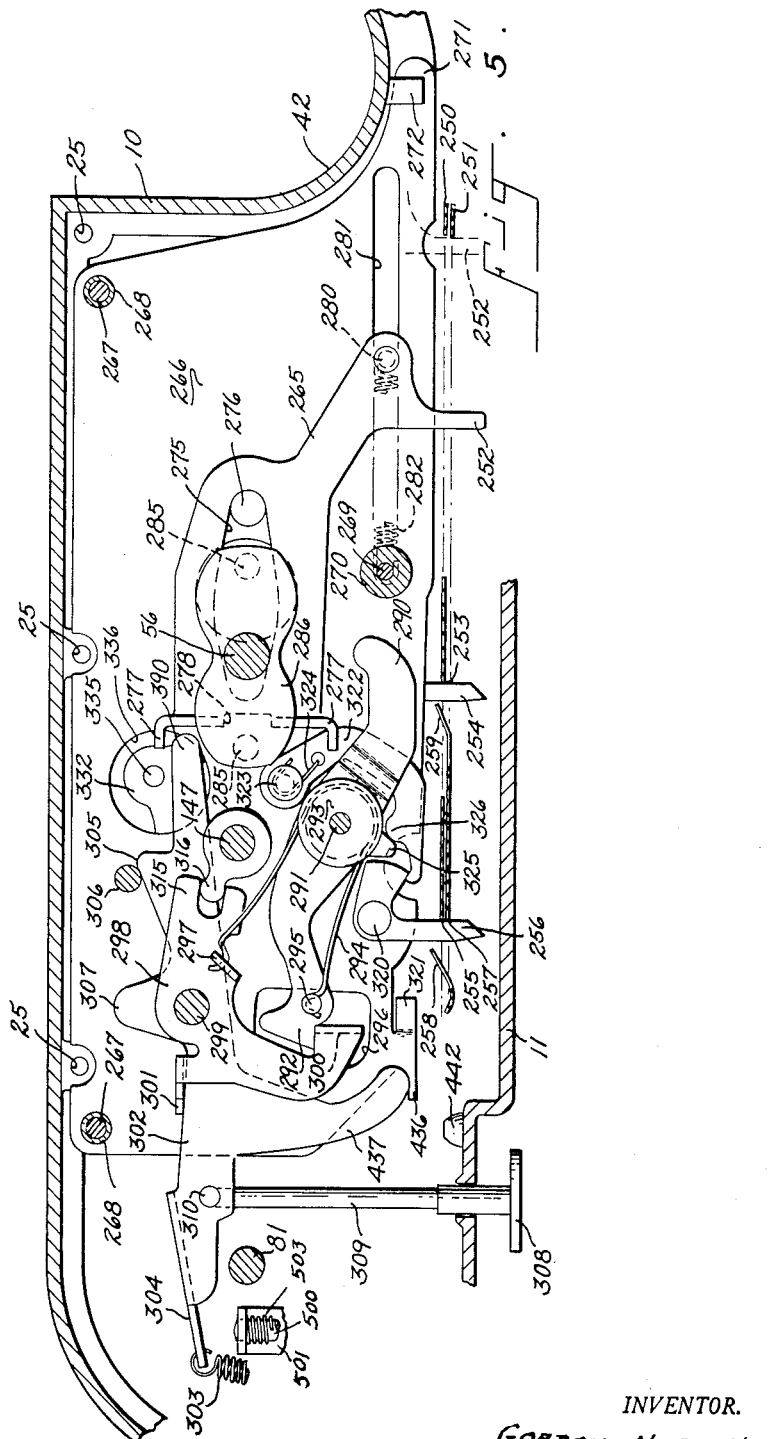

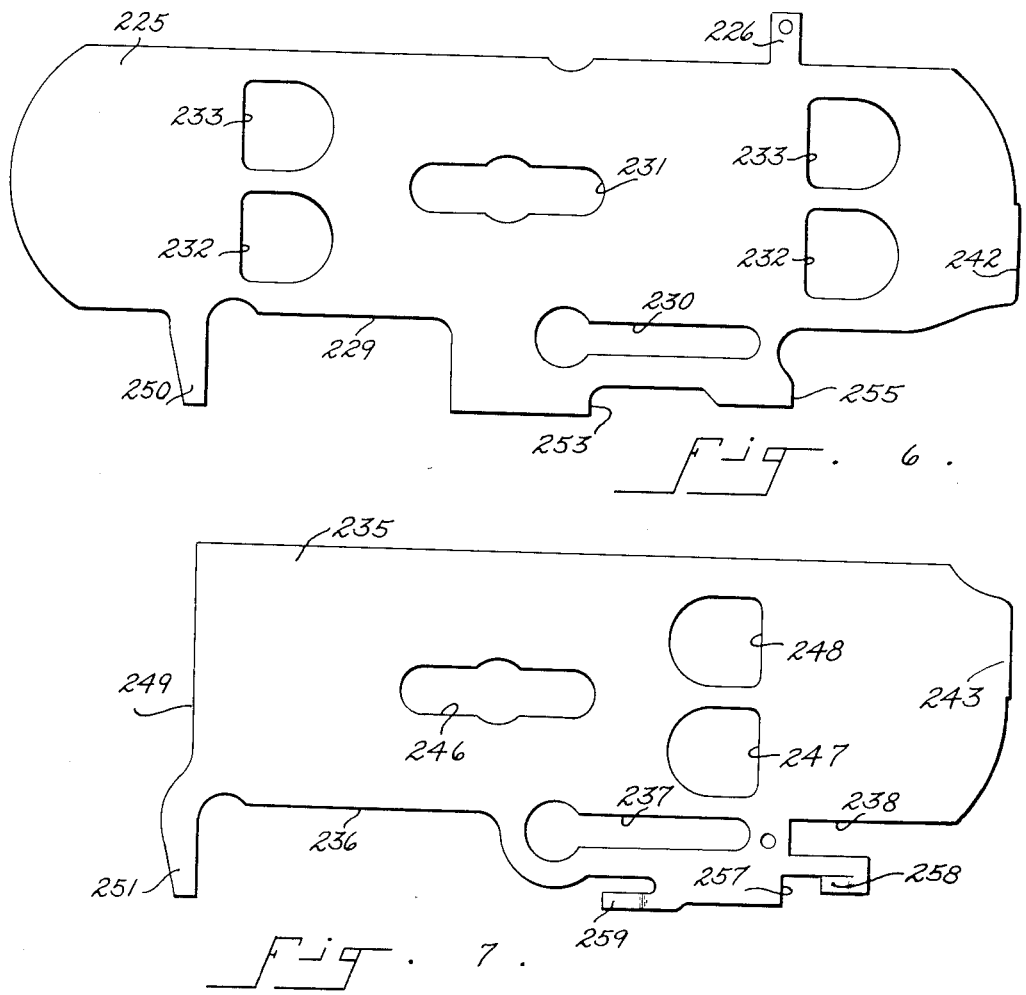

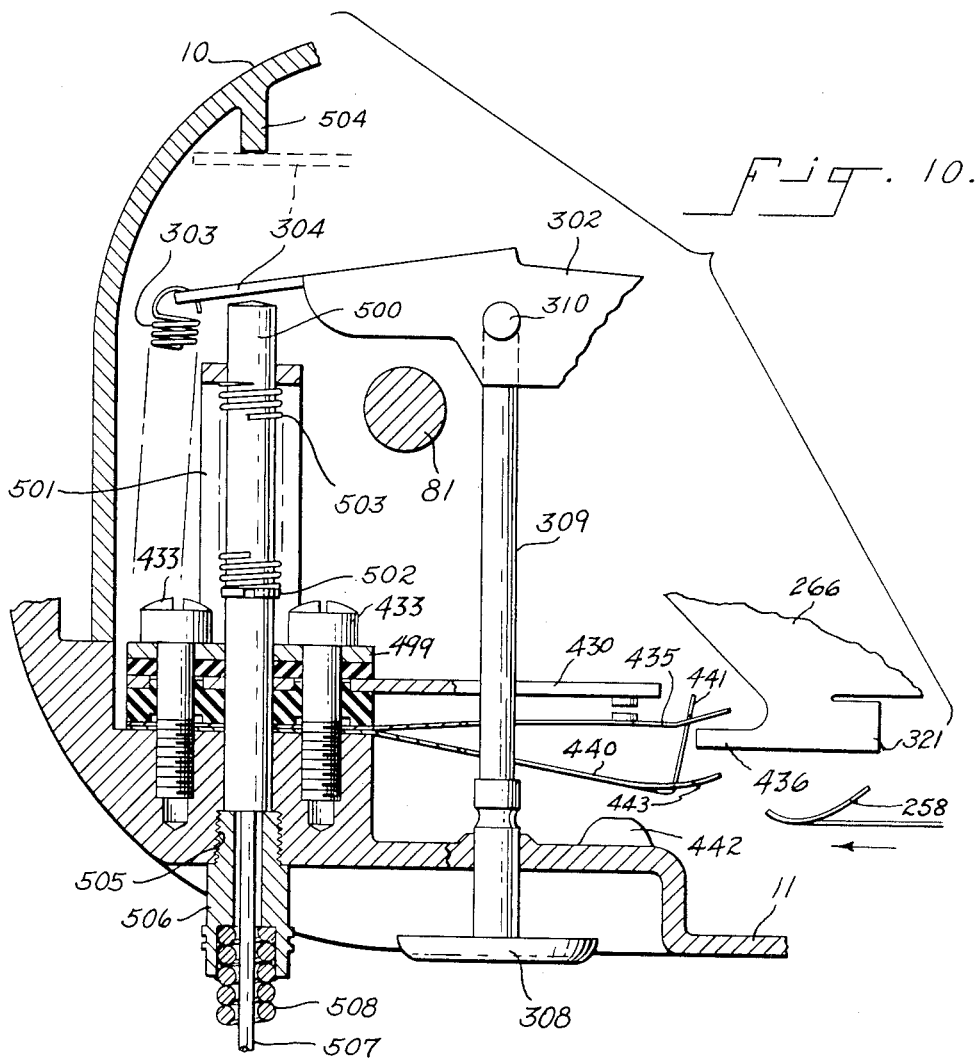

July 10, 1956     G. N. SMITH     2,753,773
PHOTOFLASH SYNCHRONIZING MEANS FOR A CAMERA
Original Filed July 3, 1950     7 Sheets-Sheet 7

INVENTOR.
GORDON N. SMITH
BY
Buckhorn and Cheatham
ATTORNEYS

United States Patent Office 2,753,773
Patented July 10, 1956

2,753,773

PHOTOFLASH SYNCHRONIZING MEANS FOR A CAMERA

Gordon N. Smith, Portland, Oreg., assignor to Sawyer's Inc., Portland, Oreg., a corporation of Oregon Original application July 3, 1950, Serial No. 171,863, now Patent No. 2,680,400, dated June 8, 1954. Divided and this application May 19, 1952, Serial No. 288,594

3 Claims. (Cl. 95—11.5)

The present invention relates to a photoflash synchronizing means for a camera, and the present application is a division of my copending application, Serial No. 171,863, filed July 3, 1950, entitled "Stereoscopic Camera," now Patent No. 2,680,400, issued June 8, 1954.

The object of the present invention is to provide means for synchronizing the action of a flash bulb igniting mechanism with the movement of shutter blades in a camera. A further object of the present invention is to provide means for preventing the accidental ignition of a flash bulb prior to release of the shutter mechanism.

The present invention is disclosed in a streoscopic camera, but it may be applied to conventional cameras for taking single exposures. The stereoscopic camera herein disclosed is particularly adapted for the production of stereo-paired transparencies which may be mounted in holders such as those described and claimed in the patent to Kurz, No. 2,571,584, issued October 16, 1951, the holders being adapted to be viewed in a viewer such as disclosed in the patent to Gruber, No. 2,189,285, issued February 6, 1940. Other patents which are mentioned in the parent application are as follows: My Patent No. 2,557,478, issued June 19, 1951, covering the built-in exposure indicating device; my Patent No. 2,515,272, issued July 18, 1950, covering a camera mechanism; and my Patent No. 2,553,015, issued May 15, 1951, covering a camera.

In the drawing,

Fig. 1 is a plan view of a stereoscopic camera made in accordance with the present invention;

Fig. 2 is a partial view of the inside of the front cover and the portions of the mechanism mounted thereon including a selector plate, a pair of shutters and a flash switch device, the selector plate being in position to permit exposure of the lower row of exposures;

Fig. 3 is a view looking up on the mechanism disclosed in Fig. 2, the view being taken from the direction indicated by the line 3—3 of Fig. 2;

Fig. 5 is a partial, sectional view looking down substantially along the line 5—5 of Fig. 4;

Fig. 6 is a view in elevation of the inner shutter alone when the inner shutter is released, the selector plate and inner shutter being in vertical alignment corresponding to the superimposition thereof illustrated in Fig. 2;

Fig. 7 is a view in elevation of the outer shutter alone in the released position corresponding to Fig. 2;

Fig. 8 is a partial view, on an enlarged scale, of the flash synchronizer switch when the shutters are cocked, illustrating the safety feature thereof for preventing accidental discharge of a flash bulb;

Fig. 9 is a view corresponding to Fig. 8 with the parts in the relative positions assumed when the trip has been almost entirely actuated, immediately prior to release of the shutter blades;

Fig. 10 is a horizontal section showing the cable release pin with a release cable attachment associated therewith, the view being taken substantially along line 10—10 of Fig. 2 and being on an enlarged scale, and showing a portion of the outer shutter approaching the released position and about to close the photoflash switch;

Fig. 11 is a partial, sectional view illustrating the means for associating a flash gun with the camera and contact connecting the flash gun to the flash switch taken substantially along line 11—11 of Fig. 1 and being on an enlarged scale.

Figure 4:
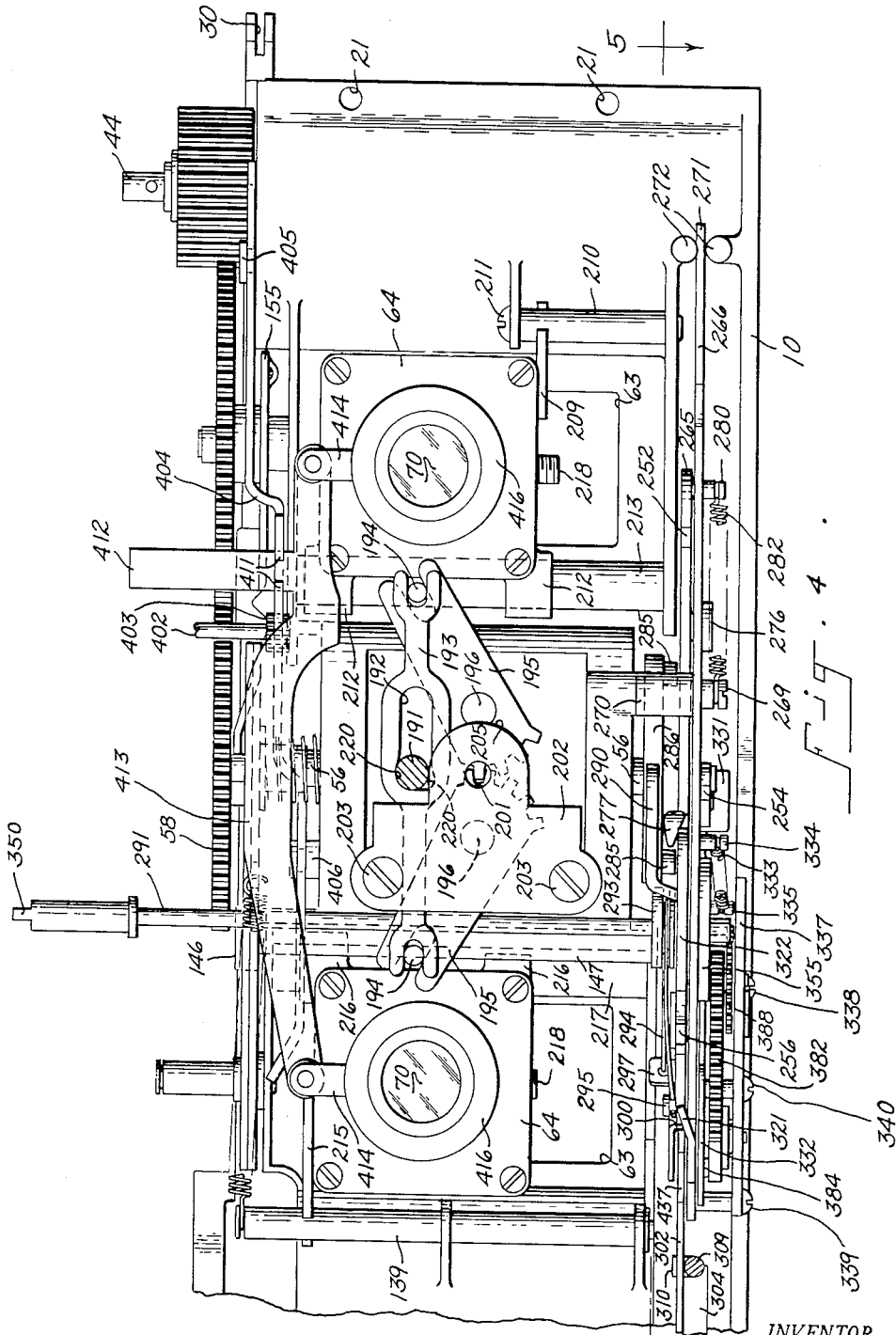
Fig. 4 is a partial view looking at the front of the frame and mechanism mounted thereon including the shiftable lens assemblies, portions of the film advancing mechanism, the shutter reset and latching mechanism and the shutter timing mechanism, the lenses being elevated to take the upper row of exposures, and the shutter mechanisms being cocked.
Figure 12:
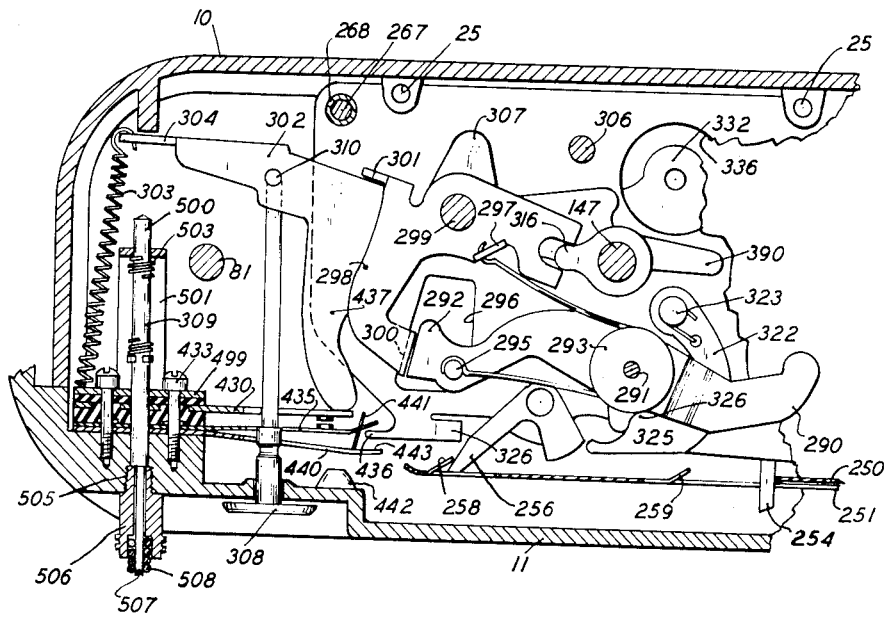
Fig. 12 is a view showing the relationship of the shutters, shutter release lever and switch when the shutters are released.

For simplicity each portion of the camera is described under an appropriate subheading.

Frame and casing

The camera comprises an interior frame generally designated by the numeral 10. The frame is enclosed within a casing consisting of four separable parts including a front cover 11 which is secured to the frame and a rear cover (not shown) which is hingedly connected to the front cover and bottom at 13 and held in closed relation thereto by a tongue (not shown) at the end opposite the hinged end, the tongue having a rectangular opening therein adapted to snap over a rectangular lug 16 (Fig. 2) on the front cover, the lug being disposed within a rectangular depression 17 to prevent accidental release of the rear cover. When it is desired to load or unload the camera the rear cover may be swung to one side about the hinge 13. The top of the case comprises a part 18 which is secured to the top of the frame. It is to be appreciated that the portions 11 and 18 are detachably secured to the frame in any convenient manner, the means for securing the same being in part relatively inaccessible so as to prevent disassembly of the camera except in the hands of an experienced, trained person. Not all of the attaching means are illustrated, but sufficient are herein illustrated to disclose the principal features thereof. For example, in Fig. 2 there are illustrated a pair of screw receiving bosses 20 adjacent the vertical flange 33 and which are adapted to receive screws passing through an end flange (not illustrated) of the frame 10, the heads of the screws being accessible when the rear cover is swung open. Also, in Fig. 4 a pair of openings 21 are illustrated in an end flange projecting from the opposite end of the frame 10 through which screws pass into threaded screw receiving bosses (not illustrated) in the opposite end of the front cover 11, the heads of the screws therein mounted being accessible when the rear cover is swung open.

The top cover 18 is interlocked with the front cover 11 so as to prevent leakage of light and must be removed before the front cover can be removed even though the screws heretofore mentioned have been removed. The top cover is held in place in part by a pair of screws having their heads engaged beneath pairs of lugs 22 (Fig. 2) projecting inwardly from the front cover 11, and engaged with threaded openings (not shown) in the bottom of the top cover, the screws being accessible by means of long, narrow screw-drivers inserted from the bottom alongside of the shutters after the bottom cover has been removed. The top cover is also held in place in part by screws (not shown) passing downward through the top cover into threaded openings in the frame (not shown). Therefore, in order to remove the top cover the bottom cover has to be removed first, the bottom cover being attached by means of screws (not shown) accessible from the outside of the bottom cover, passing through openings therein, and being received in threaded openings 25 in the rear of the frame 10 (Fig. 5) and threaded openings 26 (Fig. 3) the bottom edge of the front cover, the openings 26 extending into lugs 27 (Fig. 2). It is apparent from the foregoing that even though the bottom cover should be removed it would require expert knowledge completely to remove the casing to expose all of the mechanism.

Light is excluded from the interior of the casing by light-trapping, interfitting flanges on the casing parts and the frame. For the most part description of such interfitting flanges will be omitted, since the provision thereof is standard practice well known in the art. However, it is to be remarked that the frame 10 is preferably provided with a groove 30 (Fig. 4) in which a flange (not shown) on the hinged rear cover fits, and that the hinged rear cover is also provided with a flange (not shown) which fits into a groove provided between adjacent edge portions of the frame and of the bottom cover when the bottom cover is in position. The front cover has an inwardly projecting, vertical flange 33 (Figs. 2 and 3) adjacent the lug 16, the outer face of which is beveled in order to engage the inner beveled face of a corresponding flange (not shown) on the free end of the hinged rear cover. The rear cover is provided with a cartridge supporting shelf which fits into a continuation of the groove between the bottom cover and the bottom edge of the frame when the rear cover is swung shut in order that a cartridge may be supported in the cartridge receiving space 42 (Fig. 5) in the frame 10, the upper end and inner surface of the cartridge receiving space being formed in the frame itself. The bottom cover is provided with a large open notch (not shown) forming a continuation of the cartridge space whereby a cartridge may be inserted longitudinally from the bottom of the camera when the rear cover is swung open. The upper end of the cartridge is thus moved longitudinally into engagement with the cartridge engaging and driving spindle 44 (Fig. 4) which is provided with a forked lower end in accordance with usual practice. After the cartridge is inserted, and prior to closing of the hinged rear cover, the film leader strip is stretched across the rear of the frame 10 and the tip thereof is hooked into a take-up spool journaled in the opposite end of the frame. Film may be wound onto the take-up spool or released therefrom in accordance with the manipulation of a film advancing knob 50. Film movement is effected by sprockets (not shown) fixed to a vertical shaft 56 (Fig. 4) projecting through the top of the frame and being fixed to a horizontal, sprocket shaft driving gear 58. When the film strip has been firmly engaged the rear cover may be closed.

*Picture sequence*

As indicated more or less schematically in my Patent No. 2,680,400 the present invention is designed for use with 35 mm. film strip having upper and lower perforations therein for engagement with the sprockets and the clear space between the perforations being such that a lower row of approximately 16 mm. exposures may be taken, followed by an upper row of approximately 16 mm. exposures, with clear space between the exposures and between the upper and lower rows so that each exposure may have a margin surrounding the same when cut from the film strip to permit insertion of the views in a holding reel such as disclosed in the above-mentioned Kurz patent. In order that the upper and lower rows of exposures may be taken, the frame is provided with a spaced pair of light tunnel clearance holes 63 (Fig. 4), one at each side of the sprockets, and a spaced pair of light tunnels 64 are guided by guide posts 210 and 213, and guide posts 139 and 217, respectively, in the clearance holes for movement between upper and lower extreme positions.

The centers of the lenses 70, which are mounted in the light tunnels, are spaced apart by the average interpupillary distance of about 65 mm. so that upon each exposure a pair of stereoscopic transparencies will be produced. When the proper amount of film has been fed onto the take-up spool, the feeding direction is reversed, the light tunnels raised into position to take the upper row of exposures, and the film rewound onto the cartridge.

Film of the character described is usually supplied in cartridges containing sufficient film for twenty 35 mm. frames, and will provide twenty pairs of approximately 16 mm. exposures in each of the upper and lower rows, or in cartridges containing sufficient film for thirty-six 35 mm. frames, which will provide thirty-six pairs of approximately 16 mm. exposures in each of the upper and lower rows. The film advancing knob 50 (Fig. 1) is provided with a corresponding plurality of indicia movable past a fixed pointer 80 on the top of the camera.

As seen in Fig. 1, the indicia on knob 50 include three boldly indicated indicia numbers, namely 1, 19 and 35, the numeral 1, being directly over the tip of stop 90. When a twenty-exposure-35 mm. film is used, the exposed leader portion is first wound onto the take-up spool by advancing the film strip three times in the manner to be explained; then the knob 50 is elevated and rotated to bring the numeral 10 opposite the indicator 80. Similarly, when a thirty-six-exposure film is used, the numeral 35 is placed opposite the indicator 80. When nineteen or thirty-five exposures have been made, as the case may be, the numeral 1 comes back to the indicator 80 at the same time that a stop (not shown) arrives in such position as to prevent further winding of the film onto the take-up spool. The operator then knows that he must shift the light tunnels to the upper position and thereafter rotate the knob 50 in the opposite direction until the numeral 19 or 35 reaches the indicator again in the reverse direction.

*Selector plate and lens shift*

A selector plate 162 comprising a thin sheet metal plate is stretched across the front of the camera behind a pair of large windows 170 (Fig. 2), the centers of which are spaced apart approximately the average interpupillary distance of 65 mm., the windows being closed by optically clear glass mounted in slightly projecting window frames 171 (Fig. 1). The selector plate (Fig. 2) is provided with a lower pair of apertures 172 in horizontal alignment and spaced the same distance as the windows 170, the apertures being of sufficient size to permit the maximum amount of light through similarly spaced lenses 70 when aligned therewith while the lower row of pictures is being taken. The selector plate is also provided with an upper, horizontally aligned, offset pair of apertures 173 spaced apart by the same amount for registry with the lenses when in the upper position. The selector plate is longitudinally guided by turned steps on a pair of studs 174 (Fig. 2) guiding the upper edge thereof and by turned steps on a pair of studs 178 (Fig. 3) guiding the lower edge thereof, the upper edge of the plate being retained between the step shoulders 176 of the studs 174 and a selector plate retainer strip 177 mounted on the studs 174. The lower edge of the selector plate is retained between the step shoulders of the shutter studs 178 and a lower selector plate retainer strip 180, held in place by screws 175, so that the selector plate may be moved longitudinally from a position such that one or the other pair of apertures therethrough is in alignment with the lenses.

Movement of the selector plate is effected through a selector knob 181 on the front of the camera between the windows 170, the knob being provided with appropriate directional arrows and indicia to indicate the direction of rotation of the knob to shift the lenses. The knob is fixed to the end of a shaft 182 which extends through and is journaled in the front cover 11. Milled in the shaft is a selector plate shifting pinion 183, the teeth of which are engaged with rack teeth 185 on the lower edge of an elongated slot 186 in the central portion of the selector plate, whereby as the knob 181 is rotated 180 degrees the pinion and rack longitudinally shift the selector plate. A partial cap 187 covers the lower portion of the front of the knob 181 so that one or the other of the pair of directional arrows thereon will be hidden in order that the operator will be saved confusion and may tell at a glance which direction the knob may be rotated.

The inner end of shaft 182 is fixed to a lens shifting lever 190 having a crank pin 191 thereon which extends into a slot 192 (Fig. 4) in a lens shifting yoke 193 extending horizontally across the front of the frame. The opposite ends of the yoke 193 are provided with forks which embrace pins 194 on the adjacent edges of the light tunnels 64, the pins projecting forwardly from lugs on the adjacent forward edges of the tunnels. Each of the pins 194 is also engaged in the outer forked end of an arm of a lens shifting sector gear 195, the gears being pivoted on fixed bosses 196 of the frame 10, the inner adjacent ends of these arms being provided with gear teeth whereby movement of the pins 194 in unison in a vertical direction is assured. A coaxial extension 200 of shaft 182 projects forwardly in position to engage in a journal opening 201 in a plate 202 overlying the meshed sector gears and the shifting yoke and mounted on the frame by a pair of screws 203, so that the inner end of the shaft 182 is rigidly maintained against play. The crank 191 moves about the curved outer edge 205 of the plate 202 as the crank arm 190 is rotated through 180 degrees.

One of the light tunnels 64 is provided with a forwardly projecting guide fork 209 which is fixed to its lower surface and projects laterally to embrace a short guide post 210 mounted in lugs extending from the front wall of the portion of the frame defining the cartridge receiving space and retained by screw 211. The inner end of the opposite side of the light tunnel 64 is provided with a pair of laterally projecting guide sleeves 212 which embrace vertically spaced portions of a long guide post 213 mounted in the frame 10. The opposite side of the other light tunnel is provided with a forwardly and laterally projecting guide fork 215 at its upper front corner which embraces the upper part of the guide post 139. The opposite rear corners of this light tunnel are provided with a pair of guide sleeves 216 which project laterally and embrace a guide post 217 fixed in the frame 10. Each of the light tunnels is therefore guided on diagonally positioned, vertical posts, each guide tunnel having two portions totally embracing one of the posts and a third diagonally positioned guiding portion partially embracing the other post. This effects a three-point guiding means for precise, easily machined and easily aligned assemblies. Each of the light tunnels is provided with a pair of oppositely projecting upper and lower limiting screws 218 which may be adjusted to engage portions of the frame 10 to limit vertical movement of the light tunnels in either direction so as to align them optically with the film exposure areas, thereby properly fixing the positions of the rows of exposures with respect to the edges of the film.

The end of the slot 192 in shifting yoke 193 in vertical alignment with the journal opening 201 is provided with a pair of vertically extending upper and lower detent notches 220 into which the crank pin 191 snaps at the limit of its movement, thereby frictionally locking the light tunnels against accidental displacement from correct positions for taking the two rows of pictures. The yoke 193 is made sufficiently resilient to bow vertically as the crank pin 191 attempts to move the tunnels to a greater extent than permitted by screws 218. Considerable force is required to spring the yoke arm 193 as pin 191 leaves the detent notches 220.

*Shutters and shutter reset mechanism*

The shutters are partially disclosed in Figs. 2 and 3 in superimposed relation in released position, and are shown alone in Figs. 6 and 7. The shutters comprise a rear shutter 225 having for the most part a straight upper edge broken only by a spring anchoring tab 226 to which one end of a shutter actuating spring 227 is fixed, the other end of the spring being anchored to a pin 228 at the end of the front cover 11. The longitudinally straight upper edge of the shutter is guided in guide grooves in the studs 174, which are similar to guide grooves in studs 178 fully illustrated in Fig. 3. One of the lower studs 178 guides a lower longitudinal edge portion 229 of the rear shutter and the other stud 178 fits a slot 230 in the lower portion of the rear shutter. The shaft 182 of the selector plate shifting mechanism passes through a central horizontal slot 231 so that the rear shutter may slide longitudinally from its cocked or set position to the released position as urged by the spring 227. The rear shutter is provided with a horizontally spaced pair of lower apertures 232 having rounded right ends and squared left ends, and an upper pair of apertures 233 of identical shape in vertical alignment therewith. When the rear shutter is cocked the rounded right edges of the apertures register with the selector plate openings 172 or 173, depending upon the position of the selector plate.

The front shutter 235 rests in face-to-face relation with the rear shutter in the guiding grooves previously described, the straight upper edge being in engagement with both upper guides and the lower edge being provided with a straight portion 236 for engagement with one lower guide and a slot 237 for engagement with the other lower guide. The front shutter is provided with a longitudinally extending notch 238 near its lower right end into which extends the lower actuating spring 240, the opposite end of which is connected to a pin 241 on the cover 11.

The shutters are made of thin spring steel and weigh substantially the same amount, and the springs 227 and 240 are of substantially equal strength, so that when the shutters are released they will move across the camera at substantially the same speed. The rear shutter is provided with a nose portion 242 along its lower half and the front shutter is provided with a nose portion 243 along its upper half, the edges thereof being engageable with a fiber strip 245 mounted at its ends in supports on the cover 11 so as to be capable of springing slightly to cushion the shock of arresting the shutters at the limit of their travel. The nose portion 243 strikes the upper end of the arresting strip 245, and nose portion 242 strikes the lower end of the strip so as to minimize rebound of both shutters.

The front shutter is provided with a slot 246 through which the selector plate shifting shaft extends, and is provided with a single pair of vertically aligned apertures 247 and 248 similar to the apertures 232 and 233 but reversed so as to have squared ends at the right and rounded ends at the left. The distance between the left edges of each pair of openings 232 or 233 is the same as the distance between the right edges of the openings 247 and 248 and the vertical left edge 249 of the front shutter. When the shutters are in released position the vertical edges of apertures 247 and 248 and the edge 249 of the front shutter are at the right of the selector plate apertures 172, as seen in Fig. 2, and all of the apertures in the rear shutter are well beyond the apertures 172 and in approximate alignment with the apertures 173. When the shutters are in cocked position the vertical left edges of apertures 232 and 233 are at the left sides of the apertures 172 and solid portions of the front shutter block the passage of light therethrough.

The shutters are supplied with resetting lugs, 250 and 251 respectively, which are relatively superimposed when the shutters are in released position and when the shutters are in cocked position, the lugs being engageable by a resetting finger 252 (see Fig. 5) on a resetting lever, to be described, whereby the shutters may be moved from released to cocked position upon each film advance. The rear shutter is provided with a vertically extending, secondary latch engaging, vertical edge 253 which is engageable with a secondary shutter latch 254 capable of holding the rear shutter in set position independently of the front shutter. The rear shutter is also provided with a spaced, vertical edge 255 which is engageable with a primary shutter latch 256. The front shutter is provided with a single, vertical, primary latch engaging edge 257 which is aligned with the edge 255 when the shutters are released as seen in Fig. 2, or cocked as seen in Fig. 5, so that both shutters may be held in cocked position by the primary shutter latch 256. The primary shutter latch 256 is released to initiate an exposure and, since the front shutter is held solely thereby, the front shutter will speed across the front of the camera and come to rest with its apertures in alignment with the windows 170. At a time interval subsequent thereto the secondary shutter latch 254 is released so that the rear shutter will speed across the front of the camera and come to rest with its apertures out of line with the windows 170. The time interval between release of the front and rear shutters determines the exposure time during which light passes through the windows, both shutter blade apertures and lenses. For "bulb" exposures the front shutter is released and comes to rest, in which case the aperture 247 or 248 is opposite one of the lenses and the straight edge 249 has cleared the other lens. The rear shutter is held in cocked position with the apertures 232 and 233 in alignment with the lenses so that light may pass through the unrestricted apertures until the desired time has elapsed, whereupon the secondary shutter latch 254 is released to permit the rear shutter to travel to released position, thereby blocking the passage of light to the lenses. When the shutters are reset they travel together in the same relationship illustrated in Fig. 2 and remain in the same relationship in set position so that light is blocked until the next exposure is desired. This structure is essentially the same as that illustrated and claimed in my aforesaid copending application, Serial No. 754,961, Now Patent No. 2,553,051.

Both of the shutter latches 254 and 256 are provided with sharply beveled, pointed ends so that when the shutters are released and swing the latches back the pointed ends will be in position to engage a pair of tongues 258 and 259 which project from the front shutter beyond the rear shutter in spaced relationship to the latch engaging edges 255 and 253 thereon. When the resetting lever is actuated to move the shutters from released to cocked position the tongues force the shutter latches to swing about their pivots, thereby causing the latches to return to their holding positions.

The shutter resetting finger 252 comprises an extension of a resetting lever 265 (Figs. 4 and 5). The resetting lever 265 is supported upon a timer and resetting mechanism mounting plate 266 which extends horizontally across the lower portion of the frame in a space provided beneath the bottom of the light tunnel clearance holes 63, the plate being supported by suitable mounting means including screws 267 and spacing collars 268 surrounding the same, which screws pass into threaded openings in the bottom of the frame (not shown), a screw 269 at the front which is held in spaced relation to the bottom of the sprocket cavity by a spacer 270, and by a tongue 271 projecting longitudinally and wedged between a pair of lugs 272 projecting forwardly from the outer surface of the cartridge cavity 42. The lever 265 is provided with a slot 275 which is substantially in the shape of a long, narrow ellipse and into which projects a guiding lug 276 comprising the head of a rivet set in plate 266. The end of lever 265 away from the finger 252 is provided with a pair of upwardly projecting, hooked flanges 277 between which there is an open slot indicated at 278. The lever 265 is provided with a depending guide pin 280 which projects through a longitudinal guide slot 281 in the plate 266, the pin engaging the hooked end of a spring 282, the other end of which is anchored to the screw 269, the spring thus tending to hold the shutter resetting lever 265 in the position illustrated in Figs. 4 and 5 with the lever being maintained against the guiding lug 276. In this position the hooked flanges 277 are engageable by one or the other of a pair of driving pins 285 diametrically opposed to each other on an hourglass-shaped cam 286 fixed to the lower end of the sprocket gear shaft 56. When the sprocket gear is rotated in either direction the pins 285 successively engage one of the hooked flanges 277 and drive the finger 252 toward resetting position. Engagement of the pins 285 with the flange 277 will occur throughout the greater part of a half revolution as the lever 265 and finger 252 move the shutter blades to reset position, but when the half revolution of the sprockets is nearly completed the pin 285 will pass through the slot 278, permitting spring 282 to snap the resetting lever back to its initial position in readiness to engage the shutters when released the next time.

*Shutter latching and release mechanism*

The hourglass cam 286 (Fig. 5) is in positoin to engage an end of a driving lever 290 which is journaled on a timer cam hub 293 which, in turn, is journaled in the plate 266, the lever having an oppositely extending end 292. A peripheral groove in hub 293 loosely retains a hairpin driving spring 294 bent around the groove with one end hooked about a floating lever driving pin 295 fixed in the lever end 292. The other end of the hairpin-shaped spring 294 hooks into an ear 297 on a driving lever release pawl 298 which is pivotally mounted on a pivot 299 mounted on the plate 266. The spring is so tensioned as to tend to rock both the pawl 298 and the driving lever 290 counterclockwise (Fig. 5). The driving lever release pawl 298 is provided with a downwardly turned end flange 300 which engages the front edge of the extension 292 of the driving lever to lock the driving lever in the cocked position illustrated in Fig. 5. The release pawl is provided with a downwardly turned flange 301 which is engageable with a release lever 302, also pivoted at 299.

The release lever is normally maintained in the relation shown in Fig. 5 by a spring 303 hooked into the end of a downwardly turned flange 304 on the lever and anchored to a suitable portion of the frame (not shown), the spring urging a projection 305 on the release lever against a stop 306 projecting downwardly from the frame 10. The release lever is provided with an arm 307 bearing against the surface of plate 266 to keep the lever parallel to the plate. The release lever may be rocked clockwise from the illustrated position by pushing inwardly on a release button 308 in a recess in the front cover and fixed to the end of a release push rod 309, the rod being slidably guided in the front cover 11. The inner end of the rod is bent upwardly at 310 in such fashion as to be engageable in a small opening in the release lever, the connection being such that when the front cover is unfastened from the frame the hooked end 310 may be disconnected from the release lever in order to permit removal of the front cover. When the release button is pushed inwardly the release lever is rocked clockwise, thus pushing against the flange 301 on the release lever pawl to rock the release lever pawl clockwise about its pivot 299, thereby removing the flange 300 from engagement with the front edge of the driving lever and permitting the hairpin spring 294 to move the driving lever counterclockwise. As soon as counterclockwise motion of the driving lever commences the end edge of the portion 292 engages the outer surface of the flange 300 to lock the driving lever release pawl 298 in releasing position until resetting action is completed, in spite of the fact that the button 308 may have been released to permit the release lever to be returned to its normal position by spring 303.

The driving lever release pawl 298 is provided with a forked arm 315 which embraces the rounded end of a slide lock shaft actuating lever 316 fixed to the lower end of a slide lock shaft 147 so that when the button 308 is pushed inwardly the feeding mechanism is released as soon as the shutters are tripped. When the driving lever is released the lower end of pin 295 strikes the edge 296 of the plate 266 which acts as a limit. Also, the arm 290 rocks to a position close to the hourglass cam 286. During approximately the first quarter turn of the sprockets and cam the lever 290 is rocked clockwise by one of the four curved faces of cam 286. During approximately the first sixty degrees' rotation of the hourglass cam the flange 300 on the release pawl is engaged with the end edge of the extension 292 on the driving lever so that the release pawl is maintained in position. When the flange 300 is released the driving spring 294 snaps the release pawl back to the position illustrated in Fig. 5 with the flange 301 acting as a limit, thus immediately rotating the lock shaft 147 o prevent further feeding movement. When the release pawl 298 is thus snapped back the flange 300 re-engages the front edge of lever arm 292 to hold the driving lever in the position illustrated in Fig. 5 after the cam 286 leaves the arm 290.

The primary shutter latch 256 is pivotally mounted on plate 266 at 320 (Fig. 5) so as to be capable of swinging from the latching position illustrated to a released position in which it bears against a tab 321 struck upwardly from plate 266 (Figs. 4 and 5). It is held in latching position by a primary shutter latch pawl 322 pivoted at 323 and urged clockwise by a spring 324. A releasing lug 325 on the driving lever 290 engages a cam portion 326 on the pawl to disengage it from the latch at the proper instant, this instant remaining constantly fixed regardless of the shutter timing. When the resetting lever 265 moves the shutter blades to the reset position, tongues 258 and 259 of shutter blade 235 engage latches 256 and 254, rotating them counterclockwise to the reset position shown. When tongue 258 rotates the latch 256 to the reset position, pawl 322 hooks over the latch to bring portion 326 into contact with lug 325 of lever 290.

The secondary shutter latch 254 is pivotally mounted at 330 and is held in latching position by a hook 331 (Fig. 4) on an arm of a floating lever 332 under plate 266. The hook 331 is normally maintained forwardly by a spring 333 anchored to a pin 334 projecting downwardly from plate 266 and hooked over a pin 335 projecting in both directions from the floating lever, the upper end projecting through an opening 336 in plate 266 (Fig. 5). The lower end of pin 335 is rounded (Fig. 4) so as to slide freely over the upper surface of an escapement mounting plate 337 held in spaced relation to plate 266 by screws 338, 339 and 340 surrounded by suitable spacer sleeves not shown. When hook 331 is displaced rearwardly the secondary latch 254 is released to permit the rear shutter 225 to move to released position, the latch swinging against pin 334 where it remains in position to be returned by tongue 259 on the front shutter 235 at the next resetting operation. During the resetting action the hook 331 is brought back to bear against the cam face 341 on the secondary latch, the cam face slightly displacing the hook rearwardly until it can be snapped into holding position by spring 333.

*Shutter timing*

The timer cam shaft 291 extends above the feeding gear trains (Fig. 4) and is provided with a driver tip 350 which slidably engages in a driving slot (not shown) in a timing adjustment dial 351 (Fig. 1) journaled on the top cover 18. The dial is provided with indicia designating fractions of a second and the word "Bulb," any selected indicia being positionable opposite a fixed pointer 352 on an exposure indicator cover plate 353. As the dial is rotated shaft 291 rotates a timer cam 355 (Fig. 4) beneath plate 266. Any point on the cam corresponding to a selected point on the dial may thus be positioned in operative alignment with a fulcrum portion (not shown) on the floating lever 332. When the driving lever is released the spring 294, operating through the pin 295, and the spring 333, cause fulcrum portion to move forward into engagement with cam 355, the rounded lower end of pin 335 sliding over the surface of plate 337 to permit such movement. When the cam arrests forward movement of the fulcrum portion the pin 295 and the adjacent end of the floating lever continue to move forward, thus pivoting the floating lever to move the hook 331 rearwardly from engagement with the secondary latch 254 to release the rear shutter 225. The fulcrum portion may only engage a spiral portion of the cam, the release of the latch occurring soonest when the fulcrum engages the greatest radius portion thereof, and progressively later as the spiral decreases in radius.

In order that the releasing action may be timed accurately, the floating lever is connected to an escapement mechanism as follows: An escapement sector gear 382 is pivotally mounted on plate 337 and carries a sector gear pin 384 projecting upward into a slot (not shown) in the floating lever. The teeth of the sector gear mesh with a pinion (not shown) journaled between plates 337 and 266 and fixed to an escapement ratchet 388. An escapement pawl (not shown) is pivotally mounted on plate 337 in position to engage and release the teeth of the ratchet as it is rotated by the hairpin spring 294 operating through the driving lever 290 and the sector gear 382. The spiral of cam 355 is such that when the fastest exposure is required the floating lever 332 pivots and releases latch 254 just after pawl 322 (Fig. 5) releases latch 256 and the escapement rocks over a minimum number of teeth. As the radius of the spiral decreases the escapement pawl must rock a progressively increasing number of times before the hook 331 releases pawl 254, thus increasing the time interval between release of rear and front shutter blades, and of the film exposure.

*"Bulb" action*

When a bulb section of cam 355 is effectively aligned with the fulcrum portion of the floating lever the fulcrum can never contact the cam to release the secondary latch since the floating lever is arrested first by the pin 295 (Fig. 5) engaging the forward edge of opening 296 in the plate 266. Therefore, one shutter is released and comes to rest while the other shutter remains cocked, thus opening the apertures for timed exposures. This condition continues as long as the release button is held, but when it is permitted to return to its normal position the inner shutter is released as follows: The pin 335 (Fig. 5) is moved forward toward the front of opening 336 as the escapement is released, thus placing the pin in the return path of an extension 390 of the release lever 302. When the button is returned to its normal position by the spring 303, the extension 390 engages the pin 335 (Fig. 5) and the pin then becomes a fulcrum causing lever 332 and hook 331 to release latch 254 and terminate the exposure.

*Diaphragm adjustment*

The exposure indicator cover plate 353 also partially covers a diaphragm knob 400 (Fig. 1) which carries a plurality of aperture size indicia movable past a pointer 401. The dial is fixed to the upper end of a diaphragm pinion shaft 402 (Fig. 4) journaled in the top cover 18 and the frame 10. A pinion 403 on the lower end of shaft 402 meshes with teeth on a diaphragm rack 404 guided for longitudinal movement on top of frame 10 beneath the feeding gear train by a pair of guide pins (one shown at 405) engaging slots in the rack. The rack is provided with a large open eye so that the driver head 350 on the timer cam shaft 291 may be removed with the shutter escapement assembly when the rack is moved to one extreme position. The rack is provided with a pair of claws 411 which embrace a vertical extension 412 on a diaphragm yoke 413 extending across the front of the frame 10 (Fig. 4). Pivots connect the ends of the yoke to a pair of diaphragm levers 414 which extend through slots in the lens mounted and are operatively connected to iris diaphragms (not shown) in the usual manner. When the rack is moved the diaphragm openings are adjusted in accordance with the dial setting. The extension 412 slides vertically in the claws 411 as the light tunnels 64 are shifted as previously described. The yoke 413 is in front of the tunnel shifting yoke 193 so as not to interfere therewith, and the yoke 413 is upwardly curved at its middle so as to clear the selector plate shifting pinion 183 when lowered.

*Exposure indicator*

The central portion of top cover 18 comprises the housing for an exposure indicator such as disclosed and claimed in my aforesaid Patent No. 2,557,478. The timer dial 351 and the diaphragm knob 400 comprise portions of the indicator which cooperate with and actuate a film speed selector dial 420 through mechanism (not shown) as illustrated in said patent. The shaft to which dial 420 is fixed by a screw 421 loosely journals a light intensity dial 422 which is frictionally rotated by dial 420, or which may be slipped around by manual actuation. The dial 420 carries a "Winter" reference mark and a "Summer" reference mark, either of which is used according to the season. The dial 422 carries one group of indicia representing film emulsion speed, one of which is to be manually aligned with the proper seasonal reference mark on dial 420, the selection depending upon the film being used at the time and the aligning being accomplished by manually slipping dial 422. The opposite side of dial 422 carries a plurality of legends and reference marks representing different degrees of light intensity. Proper rotation of either the timer dial 351 or the diaphragm knob 400, or simultaneous rotation of both, will cause dial 420 frictionally to drive dial 422 until the proper light intensity reference mark on dial 422 is aligned with the proper one of a plurality of "Subject color" reference marks on the cover plate 353. The dial 351 and knob 400 are prevented by suitable stops (not shown) from rotating beyond the limits of the scales thereon. If the proper light intensity and subject color marks cannot be made to align for a desired shutter speed or diaphragm opening, the operator is thus advised that the picture would not be well exposed and that he must compromise on one or the other to have a good exposure. If alignment cannot be achieved in any fashion the operator should wait for a brighter day or take a "Bulb" exposure. In many instances alignment can be achieved in a wide variety of combinations of shutter speed and diaphragm opening, in which case selection may be determined by some factor such as the speed of movement of the subject as in photographing sporting events. Regardless of how the dials are manipulated to achieve alignment, the cam 355 and the diaphragms 417 will automatically be in readiness to effect a proper exposure.

A feature not found in the above-identified patent is herein disclosed, comprising depth of field indicating means associated with the diaphragm adjusting dial 400. It will be observed that the dial carries a plurality of indicia representing distance, which are rotatable past an edge of the plate 353 indicated by the reference character 425. The plate 353 preferably carries a suitable legend to the effect that any object between the distance indicated by the edge 425 and infinity will be in clear focus, a situation made possible by the use of universal focus lenses.

*Flash synchronization*

A switch for operating a flash attachment is provided on the front cover 11 (Figs. 2, 3, 8, 9, 10 and 12) in position to be operated by the front shutter and related mechanism. The switch comprises a rigid contact bar 430 carrying a fixed contact 431, the bar being mounted on an insulator block 432 by a pair of insulated screws 433 threaded into a lug on the cover. The fixed contact may be contacted by a movable contact 434 on a spring contact bar 435 having tension upward, and electrically grounded to the plate 11.

A spring switch actuator 440 is mounted adjacent the spring contact bar 435 with tension downward, and is provided with a hook 441 (Fig. 2) extending over the tip of spring contact bar 435. Downward tension of actuator 440 is sufficient to overpower upward tension of spring contact bar 435 and the actuator normally holds spring contact bar 435 down against a finger 436 on plate 266.

Tab 258 (Fig. 3) of the front shutter 235 is in operational alignment with a tongue 443 on actuator 440 so that when the shutter 235 is in released position a cam portion of tab 258 wedges between tongue 443 and a rounded cam projection 442 on the front plate 11 to move actuator 440 (Fig. 10) up and thereby permit spring contact bar 435 to close the contacts 431 and 434. In this way the switch is closed at the instant the front shutter blade reaches its released position whereat light is permitted to reach the lenses.

An arm 437 (Figs. 8, 9 and 12) on the release lever 302 normally engages spring contact bar 435 to hold the contacts open, this action being independent of the action of actuator 440. The arm 437 moves to inoperative position (Fig. 9) only when the release button 308 is depressed, at all other times holding contacts 431 and 434 (Fig. 8) apart. In this way, the arm permits the shutter 235 to close the contacts when the picture is taken, but opens the contacts as soon as the release button 308 is permitted to return to its normal position by spring 303. Thus the flash circuit is rendered safe and new flash-bulbs may be inserted in the flash unit safely at any time, with the camera shutter cocked or not.

A flash contact wire 445 is soldered to the fixed contact bar 430 and runs along the base of the front cover 11 above lugs 27 (Fig. 2). It is suitably secured to the end of the cover (not shown) and led up through its light trap flange, its end being soldered to a plate 450 mounted on the upper end of shaft 127 (Fig. 11). The plate is held in position by a pair of insulator washers 451 and 452, a screw 453, and metal washers 454 and 455, the washer 451 having an interlocking step to insulate the plate from the screw. The plate is made of spring material and has a contact finger 458 extending therefrom into contact with the edge of a contact washer 459 mounted in the top cover 18. The washer 459 is held in position by a contact rivet 460 (Figs. 1 and 11) extending into a socket 461 in the top cover and insulated therefrom by fiber washers 462 and 463. The socket 461 is near a screw socket 464 in which a flash gun connector (not shown) may be engaged, the gun being thereby grounded to the frame. It is to be appreciated that the gun will have a second projection insertable into socket 461 to make contact with the tip of rivet 460.

*Viewfinder*

A viewfinder lens cover 470 (Fig. 11) is retained against suitable flanges, such as flange 471, in the top cover 18 by a pair of slotted head nuts 472 engaging studs imbedded in bosses 473. The cover 470 is provided with suitable openings through which the driver head 350 on timer cam shaft 291 and the diaphragm adjusting pinion shaft 402 project. The middle of the support is trough-shaped to provide a tunnel leading from an eye opening (not shown) in the rear of the top cover to a sight opening 476 (not shown) in the front of the top cover. A spring lens retainer 477 is mounted in the trough, being held in spaced relation to the recessed portion of the top cover in which the dials 351 and 400 are seated, by a slotted spacer rivet 478 engaging a longitudinal slot in the front of the retainer, and a bridge 480 spanning the bosses at the rear. A pair of legs 481 depend from the front end of the retainer 477 and straddle a square lens 483, the legs engaging the sides of the lower portion of the lens and being provided with lugs 482 which press against the rear of the lens, the lens being thus retained in a seat provided in the cover 18. A similar pair of legs (not shown) embrace the edges of a lens in position at the rear eye opening. The space between the retainer 477 and the top cover is available for the exposure indicator mechanisms, a journal opening being provided in a boss 487 in the cover through which the shaft (not shown) supporting dials 420 and 422 extends. The forward portion of cover 470 is provided with a transverse well 491 in which is cemented a spirit level capsule 492, the capsule being out of the line of sight through the viewfinder but constantly visible when looking through the viewfinder.

Release cable mechanism

Fig. 10 illustrates an improved release cable mechanism which is built into the camera, comprising a plunger 500 having its outer end normally resting flush with the bottom of the depression in the front cover 11 in which the release button 308 is located. The plunger is maintained in alignment with the flange 304 on release lever 302 in suitable bores through a portion of the front cover 11, the flash synchronization switch mechanism including the switch members 430 and 435, the switch actuator 440, and the bracket 499. The bracket 499 has a forwardly extending arm 501 having an end flange guiding the inner end of the plunger 500. An intermediate portion of the plunger 500 is provided with an annular recess in which is seated a split ring 502 forming a retainer for one end of a compression spring 503, the other end of which bears against the upwardly extending flange of the arm 501. The plunger may be moved forward to contact the flange 304 and swing the release lever 302 until the flange strikes a limit abutment 504 on the frame 10. The outer end portion of plunger 500 is normally located within a threaded recess 505 into which may be inserted the threaded end of a release cable connector 506, thereby positioning the end of a flexible release wire 507, retained in a flexible sheath 508, adjacent the outer end of the plunger 500. The wire 507 and the sheath 508 constitute a flexible release cable, the opposite end of which supports a release mechanism operating button or the like (not shown) of any desired type for the usual purposes of such devices. The present invention is an improvement over any similar construction heretofore devised in that the plunger 500 closely fits the bore in the cover 11 inwardly from the threaded recess 505 so as to provide a dust seal for preventing the entry of foreign material into the camera. The length of the portion of the plunger which is guided in the switch mounting assembly is such that the outer end portion of the plunger is always maintained within the bore so that even though foreign material should collect on the outer end of the plunger it may not be carried into the interior of the camera when the release cable is actuated.

General operation

In review of the principal operating steps, it will suffice to state that the rear cover 12 is swung open to permit vertical insertion of a film cartridge, with the selector plate shifting knob 181 preferably rotated to expose the correct indicia, and the light tunnels adjacent the lower apertures in the shutter blades. The end of the leader strip is engaged with the take-up spool, whereupon the rear cover may be swung shut. If not previously done, the light tunnels must now be shifted to lower position. The operating knob 50 is rotated through three feeding steps, the shutter being tripped between each operation, so as to wind the exposed leader onto the take-up spool. The operating knob is now elevated and the proper or desired indicia thereon placed adjacent the pointer 80 and the lower row of pictures is taken. The selector plate shifting knob 181 is then rotated to its opposite position, thereby shifting the light tunnels and causing the selector plate to cooperate with the upper apertures in the shutter blades. The upper row of pictures is then taken. When the indicia on the operating knob comes back to the pointer to indicate that the proper number of exposures in the reverse direction have been made, the camera is operated several times to insure winding of the exposures back into the cartridge before opening the rear cover to remove the cartridge.

The camera is provided with the lens opening dial (diaphragm knob) 400 which is interconnected with the iris diaphragms, the dial being provided with indicia indicating the stop opening and, preferably, as well being provided with indicia indicating depth of field (from infinity to closest subject) corresponding to the preferable stop opening for sharp exposures with the universal focus lenses. The camera is also provided with the shutter speed setting (timing adjustment) dial 351 which is provided with indicia indicating the fraction of a second time lag between release of the inner and outer shutters, and also having a designation for bulb operation permitting manually controlled time exposures. The diaphragm and shutter adjusting dials are interconnected through the exposure indicating mechanism including the dials 420 and 422. Operation of the dials results in setting of the timer cam 355 to control the operation of the floating lever which releases the secondary shutter latch. Means are provided whereby the shutters are reset and the timing mechanism reset regardless of the direction of rotation of the knob 50.

Exposed and developed pairs of transparencies may be separated from the film strip and placed in transparency holding means for use in a stereoscopic viewing device or a projecting mechanism.

Having illustrated and described a preferred embodiment of my invention, it should be apparent to those skilled in the art that the invention permits of modification in arrangement and detail. I claim as my invention all such modifications as come within the true spirit and scope of the appended claims.

I claim:

1. A camera comprising a shutter supporting structure, a shutter plate slidably mounted for lineal movement on said supporting structure for movement from a set position to a released position, means to move said shutter plate to said set position, latching means to latch said shutter plate in said set position, releasing means for said latching means, resilient means to move said shutter plate to said released position, a flash switch mounted on said structure adjacent said shutter plate, said switch comprising a first contact and a movable contact, means normally biasing said movable contact into engagement with said first contact, a resilient leaf spring actuator including a hook engageable with said biasing means, said resilient actuator having greater resistance to flexing movement than said biasing means and being biased away from said first contact normally to hold said movable contact from engagement with said first contact, means on said shutter plate engaging said resilient actuator when said shutter plate arrives at said released position to move said resilient actuator hook from holding engagement with said biasing means and permit said movable contact to move into circuit closing relation with said first contact comprising an integral tab on said shutter plate projecting from the plane of said shutter plate in the direction of said flash switch, and cam means positively to move said switch actuator comprising a cam projection on said supporting structure engageable with said tab.

2. A camera comprising a frame, a casing enclosing said frame and including a wall, shutter controlling means including a manual release lever, a shutter plate located between said frame and said wall, guide means slidably mounting said shutter plate on said wall for movement from a set position to a released position, spring means for effecting such movement, a flash switch mounted in the camera adjacent said shutter plate and including a fixed contact and a resilient contact blade, said resilient contact blade being biased into circuit closing relation with said fixed contact, a resilient leaf spring actuator engageable with said resilient contact blade, said actuator being of greater strength than said resilient contact blade and biased in the opposite direction normally to hold the switch open, means on said shutter plate engaging said actuator when said shutter plate moves to said released position to move said actuator toward said fixed contact and permit said resilient contact blade to move into circuit closing position, means normally locking said resilient contact blade in open position comprising a portion of said release lever, and means associated with said release lever to release said shutter plate for movement from set position to released position simultaneously with movement of said release lever from locking engagement with said spring contact blade upon manual actuation of said release lever.

3. A camera comprising a flash bulb circuit including a flash switch, said flash switch comprising a spring contact blade biased toward switch closing position, shutter mechanism in the camera including a shutter release lever adapted to be manually moved to shutter releasing position, a shutter release lever spring normally holding said shutter release lever in nonreleasing position, a frame mounting said shutter release lever and having a tab adjacent said spring contact blade on the opposite side thereof from the shutter release lever, said shutter release lever comprising a portion engageable with said spring contact blade to lock the spring contact blade against said frame tab when said shutter release lever is returned to nonreleasing position by said shutter release lever spring, a resilient actuator adjacent said spring contact blade and including a portion engageable with said spring contact blade when released by said shutter release lever, said resilient actuator being biased in the direction opposite to said spring contact blade and being stronger than the latter whereby said switch is held open even though said resilient actuator is released by said shutter release lever, a shutter blade controlled by said release lever, and means on said shutter blade engageable with said resilient actuator to move it from holding engagement with said spring contact blade whereby said switch is closed in timed relation to the movement of said shutter blade.

References Cited in the file of this patent

UNITED STATES PATENTS

| | | |
|---|---|---|
| 2,256,354 | Riddell | Sept. 16, 1941 |
| 2,279,477 | Mihalyi | Apr. 14, 1942 |
| 2,282,850 | Brownscombe | May 12, 1942 |
| 2,358,941 | Schwarz | Sept. 26, 1944 |